United States Patent
Buchesky et al.

[15] 3,685,812
[45] Aug. 22, 1972

[54] VEHICLE SPRING

[72] Inventors: David M. Buchesky, Detroit; John R. Somjak, Garden City, both of Mich.

[73] Assignee: Chrysler Corporation, Highland Park, Mich.

[22] Filed: Sept. 2, 1970

[21] Appl. No.: 69,024

[52] U.S. Cl. ................................267/36, 267/47
[51] Int. Cl. .................................................F16f 1/22
[58] Field of Search..............................267/36, 47

[56] References Cited

FOREIGN PATENTS OR APPLICATIONS 285,645   2/1928   Great Britain................263/47
204,874   7/1956   Australia......................267/47

Primary Examiner—James B. Marbert
Attorney—Talburtt & Baldwin

[57] ABSTRACT

Leaf spring for an automotive vehicle, the spring having two portions each of which have different curvatures in an unstressed condition.

4 Claims, 7 Drawing Figures

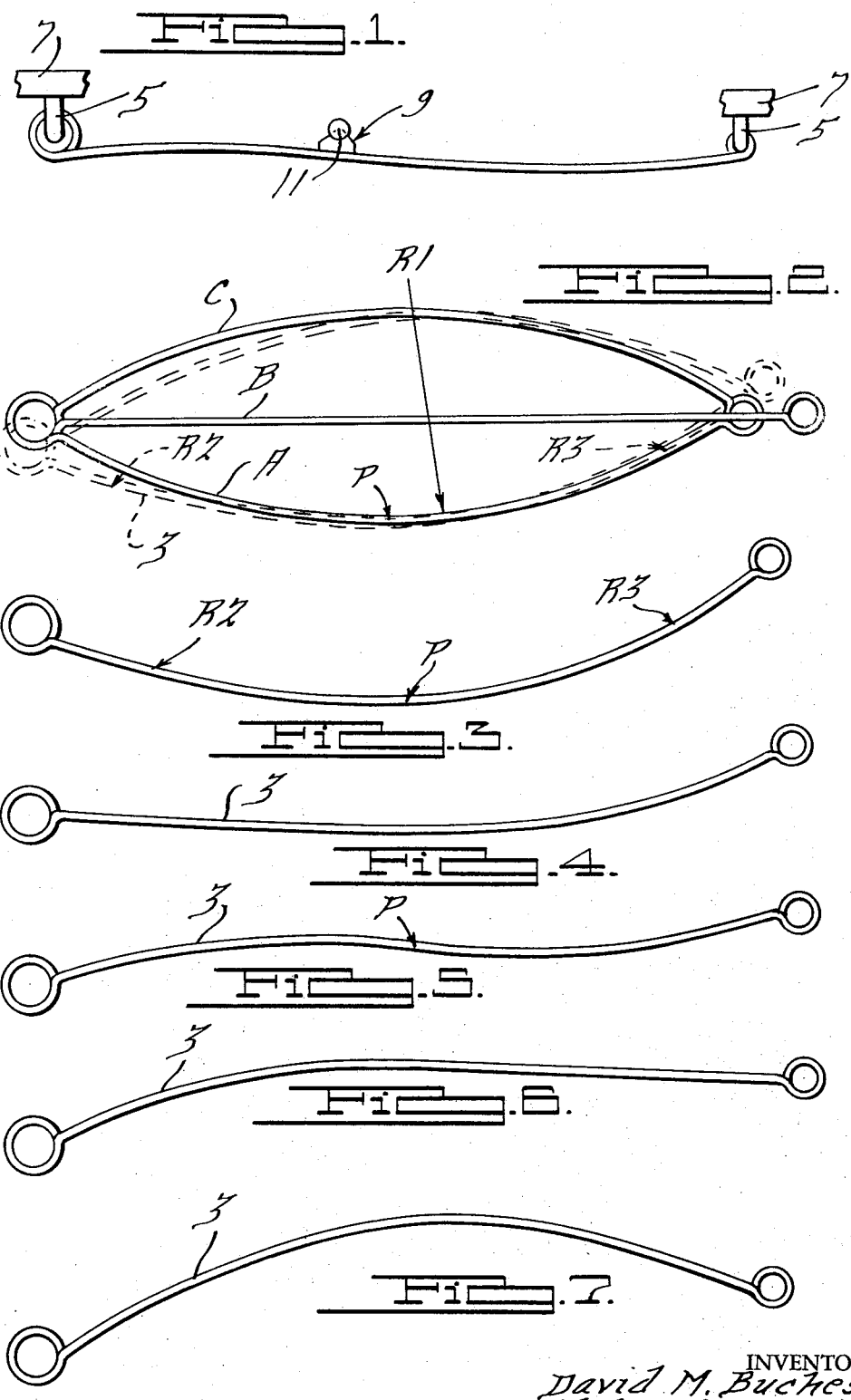

3,685,812

VEHICLE SPRING

BACKGROUND OF THE INVENTION

This invention relates to vehicle springs, and more particularly to a leaf type spring for an automotive vehicle Most automotive vehicles utilize leaf springs for connecting the rear axle of the vehicle to the vehicle chassis. The springs are generally in the form of elongated leaf shape and have eyes at the ends thereof for connecting the spring to brackets attached to the chassis. The axle is connected to the spring at some intermediate point of the latter. Most types of rear suspension spring assemblies steer the rear axle when the body rolls during a turning or cornering movement. If that steering causes the vehicle to follow a path having a tighter arc, it is referred to as roll oversteer. If the steering causes the vehicle to follow a path having a wider arc, it is referred to as roll understeer.

With a Hotchkiss type of suspension, the roll steer produced by a spring assembly can be changed by raising or lowering the installation angle of the leaf spring relative to horizontal. This is accomplished by raising or lowering the eye connections of the springs. Such raising or lowering of the eye connections obviously have some disadvantageous aspects, such as ground clearance problems, for example.

BRIEF SUMMARY OF THE INVENTION

Briefly, this invention comprises a leaf spring for an automotive vehicle, the spring having two portions each of which has a different curvature.

One of the primary objects of this invention is to provide a leaf spring in which the front eye mounting can be raised over the height of the front eye mounting of a conventional leaf spring without sacrificing roll steer characteristics.

Another object of this invention is the provision of a leaf spring of the type described in which the instantaneous center of zero velocity of the spring, which center affects the rear suspension dynamic attitude of the vehicle, can be varied.

A further object of this invention is to provide a leaf spring such as described which permits new combination of rear suspension roll steer and rear spring front eye ground clearance because of its construction.

Still another object of this invention is to provide a leaf spring of the type described which is economical in construction and effective in operation.

Other objects and advantages of this invention will be made apparent as the description progresses.

BRIEF DESCRIPTION OF THE DRAWINGS

In the accompanying drawings, in which one of various possible embodiments of the invention is illustrated:

FIG. 1 is a side elevation of a spring of the invention; and

FIG. 2 is a side elevation of a conventional symmetrical spring with a constant radius with a spring constructed in accordance with the principles of this invention shown in broken lines; and FIGS. 3–7 are side elevations of the spring shown in broken lines in FIG. 2 as the spring is loaded from the FIG. 3 position to the FIG. 7 position.

Like parts are shown by corresponding reference characters throughout the several views of the drawings.

DESCRIPTION OF THE PREFERRED EMBODIMENT

Referring now to the drawings, a conventional leaf spring is shown in solid lines in FIG. 2 at 1. This spring has the normal or usual constant radius of curvature formed in it when the spring is at a free position. The constant radius is designated R1. The spring 1 is shown in three positions designated A, B and C. Positions A and C are at the extreme position of curvature while position B is the straight position.

If, rather than forming the spring to have a constant radius R1, the spring is formed to have two new radii which are tangent at point P, greater latitude is permitted in determining the location of the eye mountings. The broken line spring 3 in FIG. 2 has two different radii R2 and R3, which radii are tangent at point P. These radii can be formed into the spring during heat treating and quenching so that no additional stresses are imposed therein. It will be seen that the curvature of the portion of the spring to the left of point P has been reduced from R1 to R2, i.e., the radius of curvature is increased, while the curvature of the portion to the right of the point P is increased from R1 to R3, i.e., the radius of curvature is decreased.

The spring 3 is shown in solid lines in FIGS. 3–7. The eyes at the end of spring 3 are connected by bracket and bushing devices 5 that pass therethrough to the frame members 7 of the vehicle. A bracket 9 connects the spring 3 to an axle housing 9. While the curvature of the left and right hand portion of the spring has been changed from R1 to R2 and R3, respectively, the total change in curvature of these portions as the spring is loaded from a FIG. 3 position to a FIG. 7 position, is the same as with similar loading of spring 1, i.e., the point P travels the same distance, under similar loading conditions, as the point P in the spring 1. Therefore, the stresses in the spring 3 remain the same as in spring 1.

In a conventional spring, as the load is increased, both the left and right hand portions will assume a straight position simultaneously.

In the spring of this invention, progressive loading first causes the left hand portion, because its curvature was originally less than R1, will become straight before the right hand portion of the spring. In fact the spring will assume a position such as shown in FIG. 5, wherein the left and right hand portions have reversed curvatures, before the right hand portion becomes straight. In this position it will be noted that the ends of spring 3 and the point P all lie on a straight line and this position corresponds to the straight line position B of spring 1. On the FIG. 6 position the right hand portion assumes a straight line condition. In FIG. 7, both portions have a reverse curvature, but the left hand portion will be curved more than the right hand portion.

It will be seen that the spring assumes an S-shape when the ends are in a straight line passing through point P. The individual half portion, or cantilevers, of the S-shaped spring bend through the same geometry or conventional spring half portions or cantilevers. The S-shape is attained because the cantilever or half portion are "out of phase" and do not assume their straight position simultaneously.

In FIG. 1 we have shown an S-shaped spring wherein the upper surface of the spring within each of the eyes lies on a straight line passing through the point 11 at which the spring is connected to the axle housing 9. In the embodiment shown in FIG. 1, the point P is closer to the left hand eye than to the right.

The S-shaped spring of the invention permits the design conceivably more latitude in locating the end eye connections.

In view of the foregoing it will be seen that the several objects and other advantages are attained.

Although several embodiments of the invention have been disclosed and described, it is apparent that other embodiments and modifications of the invention are possible.

We claim:

1. An automotive vehicle leaf spring comprising an elongated metal spring member, means at opposite ends of said spring member for securing it to a vehicle body means, means attached to said spring member at a point along the length thereof adapted to attach said spring member to an axle housing, said spring member having a first curvature extending substantially the complete distance from one end thereof to said point and a second curvature, different than said first curvature, extending substantially the complete distance from said point to said other end of said spring member.

2. An automotive vehicle leaf spring as set forth in claim 1 wherein said point is closer to one end of said spring member than the other end thereof.

3. A suspension system for an automotive vehicle having frame members, comprising a leaf spring assembly, said leaf spring assembly comprising an elongated metal spring member, eyes at the opposite ends thereof, at least one of said eyes being movable longitudinally of the spring member, means extending through each of said eyes securing the latter to said vehicle frame members, means connecting said metal spring member at a point spaced inwardly from both ends thereof to an axle housing, said metal spring member having one unstressed curvature extending from one eye thereof to said means connecting said metal spring member to said axle housing, said metal spring member having a second unstressed curvature, different than said one curvature, extending from said means connecting said metal spring to said axle housing to said other eye, said curvatures being substantially tangent at said means connecting said metal spring member to said axle housing, said one curvature being greater and said second curvature being lesser than the curvature of a spring providing the same roll steering characteristics and having a substantially constant curvature.

4. A suspension system for an automotive vehicle having frame members, comprising a leaf spring assembly, said leaf spring assembly comprising an elongated metal spring member, eyes at the opposite ends thereof, means extending through each of said eyes securing the latter to said vehicle frame members, means connecting said metal spring member at a point spaced inwardly from both ends thereof to an axle housing, said metal spring member having one unstressed curvature from one eye thereof to said means connecting said metal spring member to said axle housing, said metal spring member having a second unstressed curvature, different than said one curvature, from said means connecting said metal spring to said axle housing to said other eye, said curvatures being substantially tangent at said means connecting said metal spring member to said axle housing, said metal spring member, when a sufficiently high load is placed thereon at said means connecting said metal spring member to said axle housing, passing through a position wherein said spring member, in the area between said one eye and said point, is curved in one direction, and in the area between said other eye and said point, is curved in an opposite direction so as to form a generally S-shape.

* * * * *